United States Patent [19]

Patil et al.

[11] Patent Number: 5,248,643
[45] Date of Patent: Sep. 28, 1993

[54] MIXED ZEOLITES AND METHOD FOR PRODUCING SAME

[75] Inventors: Mallangouda D. Patil, Corning; Jimmie L. Williams, Painted Post, both of N.Y.

[73] Assignee: Corning Incorporated, Corning, N.Y.

[21] Appl. No.: 980,487

[22] Filed: Nov. 23, 1992

[51] Int. Cl.$^5$ .................. B01J 29/06; C01B 33/34
[52] U.S. Cl. ........................ 502/67; 423/709
[58] Field of Search ................ 423/709; 502/67

[56] References Cited

U.S. PATENT DOCUMENTS

| | | | |
|---|---|---|---|
| 3,244,643 | 5/1966 | Schwartz | 252/455 |
| 3,468,815 | 9/1969 | Cole et al. | 252/455 |
| 3,523,092 | 8/1970 | Kearby | 252/155 |
| 3,730,910 | 5/1973 | Albers et al. | 252/455 |
| 3,885,977 | 5/1975 | Lachman et al. | 106/62 |
| 4,127,691 | 11/1978 | Frost | 428/116 |
| 4,340,573 | 7/1982 | Vaughan et al. | 423/709 |
| 4,406,822 | 9/1983 | Sanders et al. | 423/709 |
| 4,511,667 | 4/1985 | Mao et al. | 502/64 |
| 4,758,272 | 7/1988 | Pierotti et al. | 75/246 |
| 4,800,187 | 1/1989 | Lachman et al. | 502/64 |
| 4,847,224 | 7/1989 | Fajula et al. | 502/67 |
| 4,992,233 | 2/1991 | Swaroop et al. | 419/2 |

FOREIGN PATENT DOCUMENTS 1441448 9/1972 United Kingdom .

Primary Examiner—Carl F. Dees
Attorney, Agent, or Firm—L. Rita Quatrini

[57] ABSTRACT

Mixed zeolites embedded in and strongly bound to a substrate and method for producing same are disclosed. The method comprises providing a plurality of seed zeolites, raw material for forming zeolites, the raw material comprising a source of silica, and a substrate, and combining the above, heat-treating the combination at a temperature and for a time sufficient to insure the formation of stable $SiO_2$, and hydrothermally treating the heat-treated combination with alkali hydroxide, and optionally, a source of alumina as additional raw material at least when the combination is absent a source of alumina, to produce the mixed zeolites. The substrate can either enter into the reaction to form the zeolites, or they can be non-reactive.

22 Claims, 2 Drawing Sheets

MIXED ZEOLITES AND METHOD FOR PRODUCING SAME

This invention relates to formation of mixed zeolites on the surfaces of substrates by hydrothermal treatment of substrate, zeolite seeds and zeolite-forming raw materials. The zeolite seeds and raw materials can be contacted with a separate substrate structure, or can be present as part of the structure in which case, that part of the structure is consumed in formation of the mixed zeolites. By the method of the present invention, the zeolites are intimately mixed with and strongly bound to each other and to the substrate without use of permanent external binders.

BACKGROUND OF THE INVENTION

Zeolites are widely used in chemical processes, air separation, catalytic and adsorption applications, and detergent applications. Most of these applications use synthesized zeolites. Zeolites are synthesized by hydrothermal treatment processing, and each zeolite is crystallized under unique conditions. If conditions vary even slightly from the optimum, other crystalline phases can be present as impurities.

Many applications use combinations of two or more different zeolites, which is done by mixing individual zeolites.

U.S. Pat. No. 4,800,187 relates to a methods for crystallizing a zeolite on ceramic substrates, thereby imparting excellent mechanical strength to the zeolites. Additionally, the zeolite is adhered to the substrate without a binder. This is advantageous because molecules which must contact the zeolite in the application have direct access to the zeolite pores without going through binder pores. The result is more efficient processing.

With the use of zeolites becoming more diverse and sophisticated, it would be highly desirable and an advancement in the art to have a method of formation of mixtures of more than one zeolite, and therefore have the above advantages applied thereto.

SUMMARY OF THE INVENTION

In accordance with one aspect of the invention, there is provided a method for producing mixed zeolites which method comprises providing a plurality of seed zeolites, raw material for forming zeolites, the raw material comprising a source of silica, and a substrate, and combining the above, heat-treating the combination at a temperature and for a time sufficient to insure the formation of stable $SiO_2$, and hydrothermally treating the heat-treated combination with alkali hydroxide, and optionally, a source of alumina as additional raw material at least when the combination is absent a source of alumina, to produce the mixed zeolites. In accordance with another aspect of the invention there is provided mixed zeolites embedded in and strongly bound to a substrate, produced by the method described above.

DETAILED DESCRIPTION OF THE INVENTION

Figure 1A:
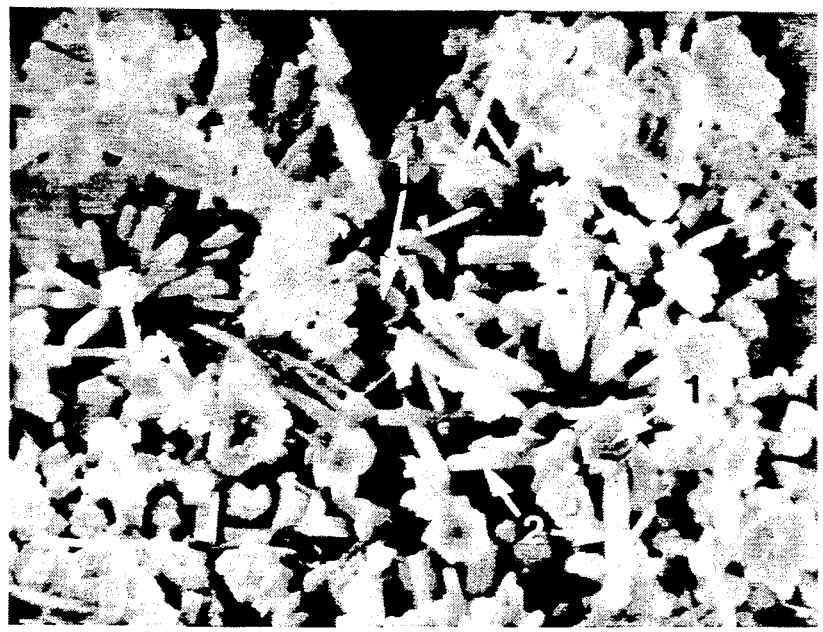
FIGS. 1a and 1b are SEM photographs of the grown zeolites taken from a view of the outside surface of the honeycomb wall, at 2000× and 10,000× respectively.

The present invention provides a method for the growth of more than one zeolite at a time on substrates. A mixture of more than one already formed zeolites which serve as the seeds from which the zeolites of the same type are to be grown, are combined with a substrate, and raw materials for forming the zeolites, and the combination is hydrothermally treated to grow the zeolites. Growing mixed zeolites from mixed seeds of those zeolites allows better control of nucleation to crystallize those zeolites, and hence purer products are obtained. Also, the zeolites are strongly bound to each other and to the substrate without use of permanent external binders.

In general, the method involves combining a substrate, the seed zeolites, and raw materials for forming the zeolites that is, silica, preferably active silica, and optionally alumina, drying the combination if necessary, heat-treating the combination at a temperature and for a time sufficient to form stable $SiO_2$, followed by hydrothermally treating with alkali hydroxide and optionally a source of alumina, which must be present if the combination does not already have a source of alumina.

The invention is not limited to the nature of the zeolites. It is contemplated that any combination or mixture of zeolites can be used, depending on the properties desired in the application. The individual zeolites making up the mixed zeolite seeds are crystalline forms provided as phases which are distinct from one another with respect to either their crystal structure type, or their $SiO_2/Al_2O_3$ mole ratios when two zeolites within a single type are chosen. In general, the average particle size of the individual zeolites is about 0.01 micrometer to about 10 micrometers.

The invention is not limited to relative amounts of the seed zeolites, but they must present in an effective amount to promote growth of the zeolites, and this is normally taken to mean at least about 0.1% by weight of the total silica raw material content and total zeolite seed content, the silica raw material content being most typically the active silica content. Advantageously, the zeolite seed content is up to about 20% by weight, and most advantageously up about 10%, and most advantageously from about 5% to about 10%.

The relative amounts of zeolites can vary according to the ratio of zeolites desired in the final mixed zeolite product. If there are two zeolite seeds, the weight ratio of the seed zeolites can range typically but not exclusively, from about 1/20 to about 20/1. Generally it is useful to have such ratios being about ½ to about 2/1 with ratios of about 1/1 being especially useful.

Some zeolites which are suited for making up the zeolite seed combinations of the present invention whether two or more of the different types or different $SiO_2$ to $Al_2O_3$ mole ratios within a type are: pentasil structure, faujasite, mordenite, and beta. Some examples of zeolite mixtures that are especially suited to the practice of the invention are the following zeolite combinations: ZSM-5 and Y-type, ZSM-5 and beta, beta and Y-type, ZSM-5 and mordenite, ZSM-5 zeolites of more than one $SiO_2/Al_2O_3$ mole ratio, eg., two mole ratios. For example, zeolites of high and lower $SiO_2/Al_2O_3$ mole ratios can be chosen to provide the advantages afforded by each ratio. One example of a zeolite combination is mordenite and ZSM-5 for Denox applications in which a wider operating temperature for the Denox reaction can be provided. Another combination, Y and ZSM-5, is designed for adsorbing hydrocarbons of a wider range of molecular weights than would be provided by a single one of these zeolites.

Since zeolites are crystalline aluminosilicates, the raw materials for forming the zeolites are a source of silica and a source of alumina. Additionally if the zeolite is to have one or more metals incorporated into its structure replacing small amounts of aluminum in the structure, the raw materials can include those metals in one form or another. Some typical metals that are incorporated into zeolite structures are Fe, Ti, Ge, V, etc. These metals can be provided in any convenient form, such as, for example, their salts, oxides, hydrated oxides, etc. The amounts of the raw material metals depends on the amount of metal desired to be incorporated, and this can be determined by those skilled in the art.

The silica and alumina sources according to the present invention are silicas, aluminas, and materials which yield silica and alumina respectively, and preferably active silica and active alumina respectively.

Active silica is high surface area silica. The active silica of this invention is silica which, after calcining has a surface area as measured by BET of about 25 $m^2/g$, preferably at least about 100 $m^2/g$, more advantageously at least about 200 $m^2/g$, and most advantageously about 200 to about 600 $m^2/g$. As used herein, "calcining" or heat-treating means heating a material to a temperature sufficiently high to substantially eliminate any volatiles but below that at which the material begins to lose substantial porosity and surface area. Examples are silicas of about 1–10 micrometers or submicrometer particle size, such as CABOSIL EH-5 colloidal silica (an amorphous silica having a precalcining surface area of about 400 $m^2/g$ and a median crystalline size of about 0.007 micrometers) available from Cabot Corporation, QUSO G-761 silica (a hydrophobic silica having a mean crystalline size of about 0.015 micrometer)) available from PQ Corporation, and LUDOX-HS colloidal silica available from E. I. Dupont de Nemours & Company. Colloidal silica derived from gels can also be used, examples of which are Grace-81 silica gel (600 $m^2/g$ surface area) available from the Davison Chemical Division of W. R. Grace and Company. Active silica precursors, which generate active silica itself upon firing, can also be used, e.g., silicone resins. The most preferred silicone resin is a hydroxyl functional silicone resin available from the Dow-Corning Company as resin QC-2230.

The alumina is provided in any convenient form that dissolves in alkaline, e.g., sodium hydroxide solution, to yield aluminate. Some typical sources of alumina, although the invention is not limited to these, are hydrated alumina such as Hydral 710, boehmite such as Dispersal from Condea, alumina sol, gamma alumina, etc. These are referred to as active aluminas. The substrate, seed zeolites, and raw materials can be provided in a number of forms and combined in any number of ways.

According to the present invention the most typical ways of providing the substrate, zeolite seeds, and raw materials are as follows.

In a first embodiment, the substrate is provided as an essentially non-reactive body. This means that it is made of material that does not enter into the reactions to form the zeolites, but functions essentially as a structural support for the grown zeolites, although there can be some reaction but to a very limited degree, such as for example, an alteration of the surface of the substrate in formation of a bond between the zeolites and the substrate. This substrate is contacted with a slurry of the seed zeolites and raw materials.

In a second embodiment, the substrate is partly reactive. This means that at least a portion of the raw materials for forming the mixed zeolites is incorporated as at least part of the substrate. In accordance with the first embodiment, the substrate is one having surfaces to which the product mixed zeolites will adhere to and which will support the mixed zeolites. As used herein "surfaces" refers to those surfaces of the substrate, including surfaces forming the pore cavities, which are normally intended to be in contact with a work stream of material, for example to be catalyzed, or which will be subject to adsorption by the mixed zeolites, etc.

In accordance with the first and preferred embodiment, the substrate can be in general, any of the types which normally support zeolites and which serve as imparting mechanical strength to the zeolites, and it is to be understood that the invention is not limited to the nature of substrate materials. Advantageously, the substrates are made of materials that include as a predominant phase: ceramic, glasses, glass ceramic, high surface area-high temperature stable oxides, metal, metal oxides, and combinations of these. By combinations is meant physical or chemical combinations, e.g., mixtures or composites. Some substrate materials that are especially suited to the practice of the present invention, are those made of cordierite, mullite, clay, talc, zircon, zirconia, spinel, alumina, silica, lithium aluminosilicates, alumina silica, feldspar, titania, fused silica, nitrides, carbides, borides, e.g., silicon carbide, silicon nitride or mixtures of these. Some typical ceramic substrates are disclosed in U.S. Pat. Nos. 4,127,691 and 3,885,977. Those patents are herein incorporated by reference as filed. Some preferred metal substrates are stainless steels and iron group metal based bodies, (Fe, Co, Ni) such as, for example, Fe and Cr and/or Al bodies with optional additions of various metals and/or oxides for various properties and applications. Some typical metal or metal alloy bodies are disclosed in U.S. Pat. Nos. 4,758,272 and 4,992,233 and U.S. application Ser. No. 767,889, filed Sep. 30, 1991. Those patents and application are herein incorporated by reference as filed. Electrically heated porous or non-porous substrates are also suitable.

The substrates can be of any size and shape suitable to the application, including rods, beads, pellets, or droplets. Preferred substrates are multicellular structures such honeycomb structures which are made typically by extrusion. The cells of the honeycomb can be either totally open, as is commonly used in catalytic applications, or some of them can be plugged, as is used in diesel particulate filter applications.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), about 47 cells/cm$^2$ (about 300 cells/in$^2$), those having about 31 cells/cm$^2$ (about 200 cells/in$^2$), or those having about 15 cells/cm$^2$ (about 100 cells/in$^2$). These bodies are made preferably of, but not limited, to materials which when fired form cordierite. Typical wall thicknesses in catalytic converter applications, for example, are about 0.15 mm, (about 0.006"), for 400 cells/in$^2$ (62 cells/cm$^2$)

honeycombs. Wall thicknesses range typically from about 0.1 to about 0.6 mm, (about 0.004" to about 0.025"). The external size and shape of the body is controlled by the application.

The substrate can have any degree of porosity from low to high. However, it is preferred that the porosity be high, that is, about 5 to about 60 vol. %, with typical average pore diameters of about 0.1 to about 200 micrometers, and more advantageously about 0.1 to about 25 micrometers. Higher porosity gives higher surface area for interaction to grow the zeolites.

The work stream passes through the open ended cells of the honeycomb through the porous walls to come in contact with the zeolite, and then exits the honeycomb.

The most typical procedure for carrying out the first embodiment will now be described.

A slurry is made of the seed zeolites and a source of silica in water in amounts and ratios as described previously. The slurry can contain also a source of alumina. Examples of two zeolite seed combinations that are especially suited to the practice of the present invention are (1) ZSM-5 and mordenite, and (2) ZSM-5 with different $SiO_2$ to $Al_2O_3$ mole ratios, as 500 to 1 and 26 to 1. In each of these combinations, a weight ratio of the pair members that is especially useful is about 1:2 to about 2:1. In these cases, the slurry is made up typically of colloidal silica and the zeolite seeds as described above.

The slurry is then contacted with a substrate, to coat the surfaces, including the pore surfaces, of the substrate. The substrate is typically a ceramic, e.g., cordierite in the form of a honeycomb. The contacting is done by known techniques such as dipping or spraying, depending on size and geometry of the substrate, and the invention is not limited to any technique. However, most typically it is done by dipping the substrate in the slurry followed removing the excess slurry by blowing it off.

The substrate is then dried to remove the water. The dipping and drying is repeated if necessary until the desired amount of slurry components are applied. The final coated substrate is then dried typically at about 50° to about 150° C. for about 3 to about 18 hours. In systems in which the $SiO_2$ stabilizes under these conditions, this drying can serve as the heat-treatment step. Otherwise, the heat treating is carried out as a separate step in addition to the drying.

If a separate heat-treating is done, the heat-treating temperature and time are sufficient to stabilize the $SiO_2$. Typical heat-treating temperatures are from about 100° to about 900° C. and most advantageously about 300° to about 500° C. for about 1 to about 18 hours. Typical heating rates are about 50° C. per hour to about 200° C. per hour.

The resulting heat-treated zeolites and silica on the substrate are then subjected to a hydrothermal treatment with alkali hydroxide, preferably sodium hydroxide. A source of alumina must be added if no alumina is present in the substrate or in the raw materials in order to satisfy the alumina raw material requirement. Otherwise, addition of a source of alumina is optional at this point. The conditions of hydrothermal treatment vary according to the nature of the zeolites that are desired to be grown. Following the above described procedure for previously described zeolite seeds (1) and (2), the hydrothermal treatment is done by introducing for every mole of silica: about 0.2 to about 0.75 moles of $Na_2O$, (supplied as sodium hydroxide), 0 to about 0.04 moles of alumina, e.g., hydrated alumina, and about 16 to about 20 moles of water. It is preferred that the water be pure at least to the level of purity afforded by deionization. Hydrothermal treatment conditions vary depending on the combination of materials. Generally, in the above described procedure for (1) and (2) zeolites, the conditions are about 100° C. to about 200° C. for about 12 to about 150 hours. The preferred hydrothermal treatment conditions are at about 150° C. to about 165° C. for about 24 to about 72 hours. The hydrothermal treatment is carried out typically in an enclosed reactor such as a bomb at autogenous pressure.

In the second embodiment, at least part of the raw materials can make up part of the substrate structure, that is, the substrate can be partly reactive. The invention is not limited to any specific way that this can be accomplished. However, there are some ways that are especially feasible and useful.

For example, in accordance with one aspect of carrying out the second embodiment, the substrate shape can be formed using matrix material, the zeolite seeds, and at least part of the required raw materials, so that the zeolite seeds and the raw material are dispersed throughout and embedded in the matrix material. The raw materials are incorporated into the substrate by being premixed with the substrate materials or the forming constituents which will eventually constitute the substrate matrix part. Some materials that are especially suited for this procedure are preformed cordierite, zirconia, mullite, low surface area silica, etc. The substrate materials are mixed with the raw materials such as silica, and a conventional temporary binder, such as methyl cellulose, and other aids as are necessary for the forming operation, and co-formed into a shaped body, such as by extrusion. The raw materials make up no greater than about 90% by weight of the total weight of the matrix and raw materials. This is to insure that the mechanical strength of the substrate is not compromised. The mixed zeolite seeds can be included in the batch mixture either wholly or partially. The resulting co-formed body is then hydrothermally treated with alkali hydroxide. In the hydrothermal treatment, silica and/or alumina sources can be introduced as additional raw materials, if necessary or desired.

In accordance with another aspect of carrying out the second embodiment, the substrate material can be silica, alumina, or a combination thereof, with part of the substrate being of active silica, active alumina or a combination thereof as the raw materials. This substrate is then contacted with a slurry of the seed zeolites and raw materials. The amounts of raw materials in the slurry make up the balance of what is additionally required over what is supplied by the substrate. Any silica and/or alumina that is not included in the active silica and/or active alumina portion of the substrate, that is, non active silica e.g., low surface area silica, or non active alumina, e.g., alpha alumina, gives strength to the substrate. It is advantageous that the substrate have no greater than about 90% by weight and more advantageously 10% to about 90% by weight of the active silica and/or active alumina raw materials. The balance of the substrate is non-active silica and/or alumina and does not enter into the reaction to form the zeolites to any significant degree. It is predominately the active silica that takes part in the zeolite formation. Such substrates can take any physical form depending on the application. One typical form is beads. The beads can be obtained from a supplier. The substrate, e.g., beads is immersed in a slurry, dried, heat-treated and hydrothermally treated as described for the first embodiment.

To more fully illustrate the invention, the following non-limiting examples are presented. All parts, portions, and percentages are on a weight basis unless otherwise stated.

EXAMPLE 1 (INVENTIVE)

Growing ZSM-5 and Mordenite on Cordierite Substrate

Figure 1B:
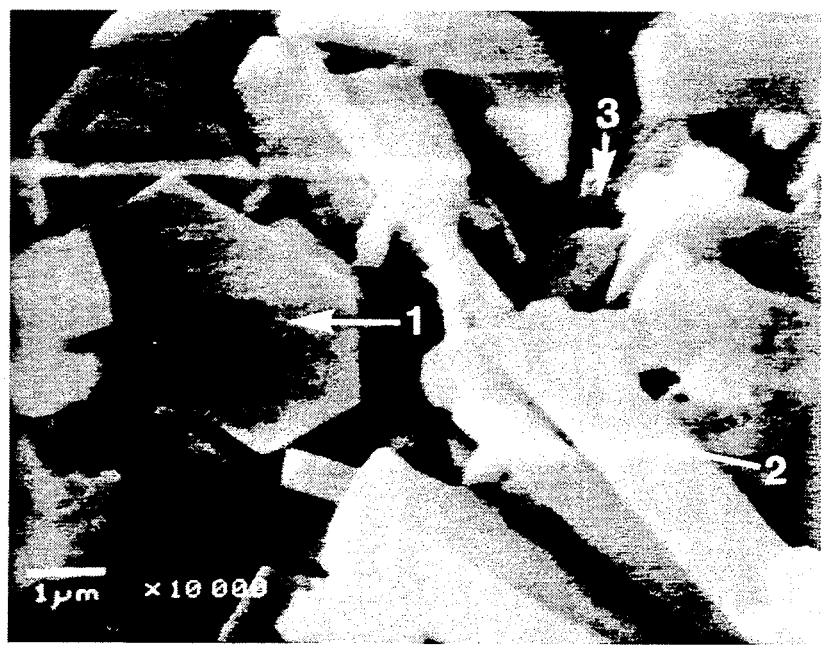
Figure 2A:
FIGS. 2a and 2b are SEM photographs of the grown zeolites taken from a view of a freshly cracked honeycomb wall at 2000× and 5000× respectively.
Figure 2B:

A washcoat slurry is made with about 3500 parts of Ludox-HS-40 (Dupont colloidal silica, (40% silica), about 78 parts of mordenite (CBV-20A from PQ), and about 78 parts of ZSM-5 ($SiO_2/Al_2O_3$ mole ratio of about 55/1 from Mobil). The slurry is rolled for about 2 hours with about 400 parts of ½ alumina media balls. This composition when dried yields about 90% silica, about 5% ZSM-5 and about 5% mordenite in the washcoat. About 1372 parts of a honeycomb substrate, about 2.4 liters, about 14 cm (about 5.6") in diameter, about 15 cm (about 6") long having a porosity of about 50 vol. %, and an average pore size of about 35 micrometers in diameter is dipped into the slurry to coat it with the silica and the seed zeolites. The washcoated honeycomb is dried and heat-treated at about 500° C. for about 3 hours. The honeycomb has an increase in weight of about 378 parts (about 27.5%). The washcoated honeycomb is introduced into a hydrothermal reactor with a hydrothermal solution of about 68 parts of NaOH, about 7 parts of hydrated alumina (AC-714KC), and four liters of distilled water. The hydrothermal treatment (crystallization) is carried out at about 160° C. for about 72 hours at an autogenous pressure of about 100 psi. After the hydrothermal treatment, the honeycomb with grown zeolites is washed with distilled water and characterized by XRD, and SEM, and tested for hydrocarbon adsorption. Table 1 below shows the x-ray diffraction peaks for the product ZSM-5 and mordenite zeolites and for the cordierite substrate. It shows first of all that the material is essentially crystalline. It also shows that two zeolite phases are present. The peaks marked "M" are the mordenite peaks; the peaks marked "Z" are the ZSM-5 zeolite peaks; and the peaks marked "C" are the substrate cordierite peaks. FIGS. 1a and 1b are SEM photographs of the grown zeolites taken from a view of the outside surface of the honeycomb wall, at 2000× and 10,000× respectively. FIGS. 2a and 2b are SEM photographs of the grown zeolites taken from a view of a freshly cracked honeycomb wall at 2000× and 5000× respectively. The SEM photographs all show essentially all crystalline material, and crystals of both zeolites. The crystals labelled as 1 are ZSM-5 zeolite and those labelled 2 are mordenite. The spaces in which no crystals are present are labelled as 3 for comparison purpose. Therefore, it can be seen that mixed zeolites can be grown from mixed zeolite seeds by the method of the present invention.

TABLE 1

| d/A | Relative Intensity | Peak Identification* |
|---|---|---|
| 13.8046 | 1 | M |
| 11.2406 | 4 | Z |
| 10.2016 | 1 | Z |
| 9.1109 | 8 | M |
| 8.5180 | 98 | C |
| 6.6001 | 7 | M |
| 6.4145 | 5 | Z |
| 6.0618 | 3 | Z |
| 4.9218 | 32 | C + Z |
| 4.6860 | 16 | C |
| 4.5348 | 8 | M |
| 4.2806 | 3 | |
| 4.1009 | 75 | C |
| 4.0055 | 15 | C |
| 3.8721 | 14 | Z |
| 3.8301 | 15 | Z |
| 3.7490 | 10 | Z |
| 3.6623 | 6 | Z |
| 3.4816 | 26 | M |
| 3.3892 | 96 | M |
| 3.2218 | 14 | M |
| 3.1445 | 100 | C |
| 3.0450 | 97 | C |
| 3.0233 | 66 | C |
| 2.9000 | 9 | Z |
| 2.7011 | 3 | |
| 2.6518 | 37 | C |
| 2.5602 | 4 | |
| 2.5255 | 6 | Z |
| 2.4590 | 9 | Z |
| 2.4371 | 8 | M |
| 2.3398 | 20 | C |
| 2.3009 | 4 | |
| 2.2830 | 4 | C |
| 2.2392 | 6 | C + M |
| 2.1776 | 8 | C + Z + M |
| 2.1136 | 1 | C |
| 2.0985 | 14 | C + Z |
| 2.0505 | 5 | M |
| 1.9997 | 3 | Z |
| 1.9548 | 11 | C + M + Z |
| 1.8845 | 19 | C |
| 1.8477 | 7 | C |
| 1.8150 | 9 | C |
| 1.8018 | 13 | C |
| 1.7098 | 10 | C + M |
| 1.6954 | 45 | C |
| 1.6599 | 7 | C |
| 1.6182 | 5 | C + M |
| 1.5915 | 14 | C |
| 1.5611 | 5 | M |
| 1.5469 | 4 | M |
| 1.5316 | 6 | C |

*crystalline phases (C = cordierite; M = mordenite; Z = ZSM-5)

It should be understood that while the present invention has been described in detail with respect to certain illustrative embodiments thereof, it should not be considered limited to such but may be used in other ways without departing from the spirit of the invention and the scope of the appended claims.

What is claimed is:

1. A method of growing mixed zeolites, said method comprising:
   a) providing and combining:
      i) a plurality of seed zeolites,
      ii) raw material for forming zeolites, said raw material comprising a source of different types of silica, and
      iii) a substrate,
   b) heat-treating the combination at a temperature and for a time sufficient to insure the formation of stable $SiO_2$; and
   c) hydrothermally treating the heat-treated combination with alkali hydroxide, and optionally, a source of alumina as additional raw material at least when said combination is absent a source of alumina, to produce said mixed zeolites.

2. A method of claim 1 wherein said zeolite seeds are two or more selected from the group consisting of pentasil structure, faujasite, mordenite, and beta.

3. A method of claim 1 wherein the zeolite seed content is at least about 0.1% by weight based on the total silica raw material and zeolite seed content.

4. A method of claim 3 wherein said zeolite seed content is up to about 20% by weight.

5. A method of claim 4 wherein said seed content is up to about 10% by weight.

6. A method of claim 2 wherein said zeolite seeds are pairs selected from the group consisting of ZSM-5 and Y-type, ZSM-5 and beta, beta and Y-type, ZSM-5 and mordenite, and ZSM-5 zeolites having two different $SiO_2/Al_2O_3$ mole ratio ranges.

7. A method of claim 6 wherein the zeolite pair members are in a weight ratio of about 1:20 to about 20:1.

8. A method of claim 1 wherein said source of silica is a source of active silica.

9. A method of claim 1 wherein said raw materials in step
a) further comprise a source of alumina.

10. A method of claim 9 wherein said source of alumina is a source of active alumina.

11. A method of claim 1 wherein step a) is carried out by providing a substrate made of material selected from the group consisting of ceramic, glasses, glass ceramic, metal, high surface area-high temperature stable oxides, metal oxides, and combinations thereof, and a slurry comprising said seed zeolites and said raw material, and contacting said substrate with said slurry.

12. A method of claim 11 wherein the substrate is a honeycomb structure.

13. A method of claim 11 wherein the substrate is made of cordierite.

14. A method of claim 11 wherein said zeolite seeds are pairs selected from the group consisting of ZSM-5mordenite, and ZSM-5 zeolites having $SiO_2/Al_2O_3$ mole ratios of about 500/1 and about 26/1.

15. A method of claim 14 wherein the hydrothermal treatment step is carried out by contacting the substrate-zeolite seed-silica combination with a solution comprising about 0.2 to about 0.75 moles of $Na_2O$, 0 to about 0.04 moles of alumina, and about 16 to about 20 moles of water.

16. A method of claim 15 wherein the hydrothermal treatment is carried out at a temperature of about 100° C. to about 200° C. for about 12 hours to about 150 hours in an enclosed reactor.

17. A method of claim 1 wherein step a) is carried out by providing matrix material selected from the group consisting of ceramic, glasses, glass ceramic, metal, high surface area-high temperature stable oxides, metal oxides, and combinations thereof, and by providing said zeolite seeds and said raw material dispersed throughout and embedded in the matrix material.

18. A method of claim 7 wherein the matrix material, zeolite seeds, and raw material form a honeycomb structure.

19. A method for claim 18 wherein said raw materials comprise no greater than about 90% by weight of the combined weight of the matrix material and the raw material.

20. A method of claim 1 wherein step a) is carried out by providing a substrate made of material selected from the group consisting of silica, alumina, and combinations thereof, wherein a portion of the substrate is selected from the group consisting of active silica, active alumina, and combinations thereof, and a slurry comprising said seed zeolites, and contacting said substrate with said slurry.

21. A method of claim 20 wherein said portion makes up no greater than about 90% by weight of the substrate.

22. Mixed zeolites dispersed and embedded in a substrate, and produced by the method of claim 1.

* * * * *

UNITED STATES PATENT AND TRADEMARK OFFICE
CERTIFICATE OF CORRECTION

PATENT NO. : 5,248,643
DATED : September 28, 1993
INVENTOR(S) : Mallanagouda D. Patil and Jimmie L. Williams It is certified that error appears in the above-indentified patent and that said Letters Patent is hereby corrected as shown below:

Col. 10, line 18, "7" should be "17"    Claim 18

Signed and Sealed this

Twenty-fourth Day of January, 1995

Attest:

BRUCE LEHMAN

Attesting Officer    Commissioner of Patents and Trademarks